Figure 1:
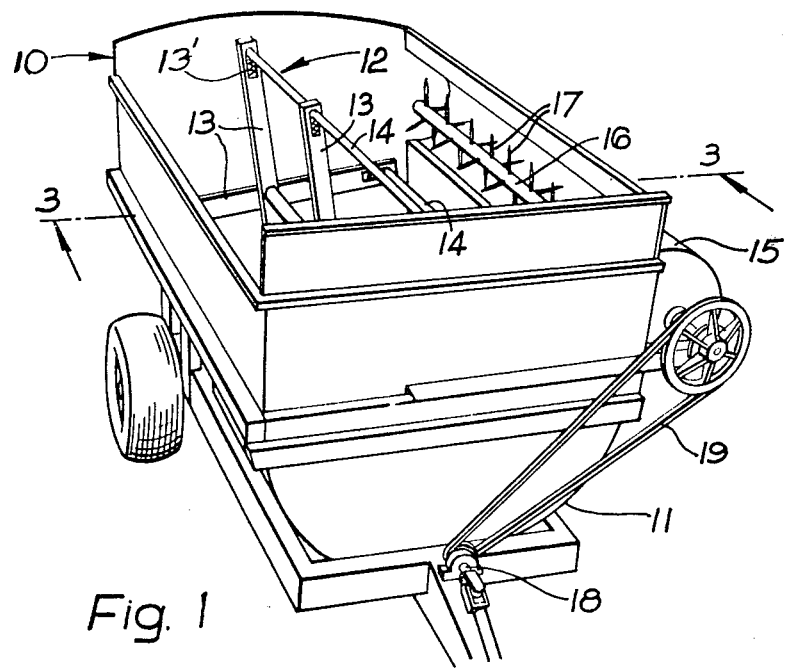

United States Patent [19]

Walley

[11] 4,298,289
[45] Nov. 3, 1981

[54] MIXING DEVICE

[76] Inventor: Charles E. Walley, Cotton Abbotts, Waverton, Chester, England, CH3 5PH

[21] Appl. No.: 98,360

[22] Filed: Nov. 28, 1979

[30] Foreign Application Priority Data

Dec. 2, 1978 [GB] United Kingdom ............ 46978/78

[51] Int. Cl.³ .................. B01F 7/02; B01F 15/02; A23N 17/00
[52] U.S. Cl. ............................ 366/196; 241/101 B; 241/101.7; 366/298; 366/299; 366/603
[58] Field of Search ............ 366/196, 603, 292, 297, 366/298, 299, 300; 241/101 B, 101.7

[56] References Cited

U.S. PATENT DOCUMENTS

| | | | |
|---|---|---|---|
| 3,071,352 | 1/1963 | McIntyre | 366/300 |
| 3,672,640 | 6/1972 | Crose | 366/300 |
| 4,083,501 | 4/1978 | Ryan | 241/101.7 X |

FOREIGN PATENT DOCUMENTS 501170  6/1930  Fed. Rep. of Germany ...... 366/299

Primary Examiner—Philip R. Coe
Attorney, Agent, or Firm—Norris & Bateman

[57] ABSTRACT

A mixing device for bulk materials, particularly an agricultural trailer for mixing and dispensing silage, concentrates and other animal feedstuffs, includes a non-tipping body (10) within which rotates a main agitator (12) having members (14) which travel closely along the walls (11) of a lower zone of the body to carry material therein upwardly during part of their travel, and a secondary rotating agitator (16) towards the top and to one side of the body which operatively intercepts material carried towards it by the main agitator, separates it therefrom and returns it thereto. A part (15) of the body containing the secondary agitator can be opened for discharge of material under the same action of the agitators, in the case of a feed trailer discharge being at sufficient height to clear the feed fence of a stockyard.

5 Claims, 3 Drawing Figures

MIXING DEVICE

This invention relates to devices for mixing bulk quantities of animal feedstuffs incorporating silage or other fodder and/or for mixing materials of similar non-flowable dry, moists, pasty and/or fibrous content. The invention is particularly but not exclusively directed to a self-mixing agricultural feed trailer or other vehicle enabling silage or the like to be mixed with meal, concentrates and other feedstuffs as used in the intensive husbandry of high-yielding dairy cattle.

Such mixing is desirable where a herd of cattle is housed or yarded together as the precise proportions of ingredients making up the feed can be regulated by the farmer according to current requirements, e.g. for most economical milk production, while giving all the animals access to a common bulk supply made up uniformly. The feed can be delivered to the animals once a day for consumption by them over a period so saving labour and encouraging better digestion, and as the expensive and tasty concentrates etc. are distributed throughout the mixture the animals cannot pick and choose, and all receive a fair share.

It is known to provide self-mixing feed trailers but these have been complex and expensive items of machinery, in one example mixing is effected by providing three contra-rotating auger agitators to circulate material from end to end of a hopper body. The nature of silage, which is wet, fibrous, and not easily cut, divided or stirred means that considerable power is necessary, the augers have to be of massive strength, and the mixing process takes a considerable time—upwards of 15 minutes for a full load. Moreover, discharge from known vehicles is at a low level giving rise to problems where feed is to be delivered over or through feed fences to yarded stock.

The object of the invention is to provide a mixing device, and particularly an agricultural mixing vehicle, which is cheap, reliable in use, effective and simple in operation, and in which the loading, mixing and discharging operations can be carried out particularly speedily and efficiently with a minimum of labour and no special auxilliary fixed or other equipment such as fixed storage hoppers or the like.

According to one aspect of the invention there is provided a mixing device comprising a container body, a main agitator operatively driven for circulation within the body and provided with members which travel in close proximity to at least a lower zone of the body walls to carry material along them in an upward direction during part of their travel, and a secondary rotatably driven agitator positioned towards the top and to one side of said zone to intercept material carried towards it by the main agitator in use, separate it from the main bulk of the material, and return it to said bulk.

According to another aspect of the invention there is provided a method of mixing material including the steps of providing a container for holding a bulk quantity of the material to be mixed, actuating a main agitator within said container to cause at least a part of said material lying against a lower zone of the container walls to be swept therealong in an upwardly extending path, and rotating a secondary agitator in a position which will intercept at least part of the material moving in said path to displace it therefrom and return is to the main bulk.

Figure 2:
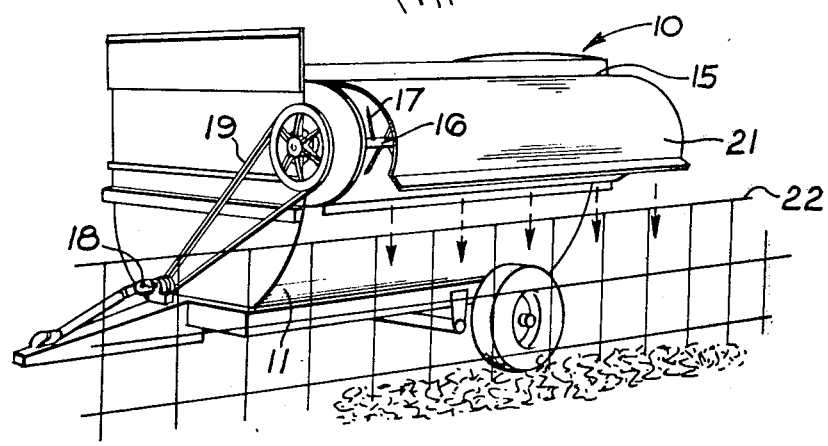
Figure 3:
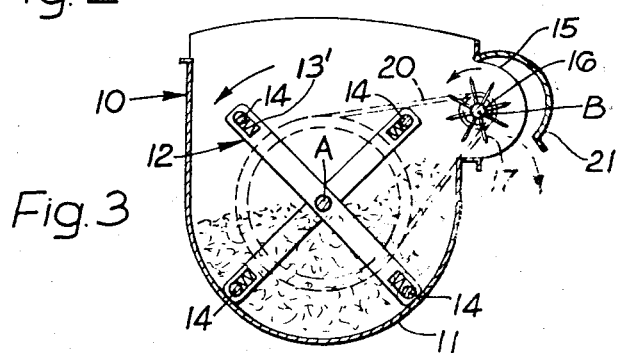

One way of carrying out the invention is now described in detail by way of example with reference to the accompanying drawings in which:

FIG. 1 is a diagrammatic view of an agricultural feed mixing trailer viewed from its front end, FIG. 2 is a similar view from another angle of said trailer discharging over a feed fence, and FIG. 3 is a diagrammatic lateral section of the trailer on line 3—3 of FIG. 1.

A two-wheeled tractor drawn trailer is provided with a non-tipping body 10 having an open top and a part-cylindrical lower zone defined by a curved floor 11 centred on a longitudinal axis A (FIG. 3) of the trailer and which is without any discharge opening.

On said axis A there is journalled a main agitator 12 having a cylindrical envelope of revolution which occupies substantially the whole of the body 10, its main shaft being provided with spoked spiders 13 which support four equi-angularly spaced longitudinal agitator bars 14. These bars travel in close proximity (about 25-30 mm clearance) along the curved wall 11 of said lower zone and are attached to the spiders 13 by resilient mountings 131 so that they are spring loaded in the outwardly radial direction. This avoids damage if lumps of material should become wedged between bars 14 and wall 11.

Somewhat above the horizontal plane of axis A and to the right hand side (as viewed in the drawings) of the main envelope of body 10 is a part-cylindrical laterally projecting body extension 15 within which is a secondary agitator 16 journalled on a second longitudinal axis B (FIG. 3) and including a number of randomly arranged (i.e. non-spirally disposed) pointed tines 17. Agitator 16 is driven in the same direction of rotation as main agitator 12, i.e. anti-clockwise as viewed in the drawings.

Both agitators are driven from and in the same direction of rotation as the tractor power take-off shaft by speed-reducing sprockets and roller chains, the drive being taken firstly from a primary shaft 18 to secondary agitator 16 by a chain drive 19 at the front of body 10 and secondly, with a more substantial speed reduction, from the shaft of agitator 16 to the main agitator shaft by a chain drive 20 at the rear of body 10 (FIG. 3), thus the drive speed of agitator 16 is considerably greater than that of agitator 12, and as agitator 16 is much smaller in diameter its peripheral speed is very much greater than the peripheral speed of agitator 12. For example agitator 16 may be driven at 10 times the speed of revolution of agitator 12, a typical operating speed of the latter being about 7 r.p.m.

The overall diameter of agitator 16 is such that it has substantial running clearance within extension 15 and projects a small distance (possibly 50-75 mm) into the main body envelope just above the upward termination of the curved wall 11 so that it is in close proximity to the path swept by the main agitator bars 14.

In use, the trailer is loaded with a bulk quantity of materials to be mixed, conveniently by means of a tractor front-end loader, e.g. silage, concentrates, meal, and/or other feed ingredients or additives while both agitators are kept in rotation. Mixing takes place as a continuous process while loading is carried out so that no time is wasted. The action of the main agitator 12 is to sweep the material around the curved wall 11 of the lower zone of body 10 and upwards towards secondary agitator 16. The tips of tines 17 of the latter intercept a peripheral portion of the mass of material as it moves upwards, shredding or tearing it away from the main bulk and carrying it rapidly around within extension 15 to return it onto the top of the main rotating bulk. In this way it is not necessary for the heavily loaded main agitator 12 (which has to move the entire load) to tear or cut through the sticky and fibrous silage. Additionally rotation of main agitator 12 may provide mixing by a tumbling action on the material especially if it is of a light or more open consistency e.g. due to the tearing action of the secondary agitator 16, also depending to some extent on the volume of material in body 10; this action may not be very effective with a full load in which case agitator 16 will play a greater part. The combined action of both agitators gives speedy and effective mixing of the entire bulk in a very short time, it has been found in practice that the load will be adequately mixed by the time the trailer has been filled. For example an 8.5 cubic meter capacity body 10 will accommodate 4 to 4.70 tons of silage and concentrate which will be mixed in 1 minutes or less. Mixing can proceed while the trailer is travelling to a discharge position.

When ready for discharge a longitudinally extending top hinged door 21 forming the laterally outer side wall of extension 15 is opened by means of hydraulic rams at each end while the agitators are maintained in motion. The material intercepted by secondary agitator 16 is thrown from extension 15 and drops through the open door instead of being returned to bulk as referred to above. Discharge is at sufficient height (over 1.38 m, conveniently 1.45 m) to clear a normal feed fence 22 as indicated in FIG. 2, thus the trailer can be driven along the fence of a stockyard to deliver the ready-mixed bulk feed to the cattle therein in a single operation without any manual handling.

It has been found in practice that the action of the agitators during discharge will completely empty the trailer without any provision for tipping, openings in the main body or special discharge mechanism. As the body empties, the bars 14 of main agitator 12 continue to carry material upwards along curved wall 11 to deliver it to secondary agitator 16 until the body is swept completely clear.

The tines 17 or other formations of the secondary agitator 16 are preferably not arranged in a spiral pattern because it has been found that this tends to drive all the material to one end of the body; it is preferred that mixing is not effected by any substantial axial transfer of material but rather by actions of rotational tumbling with removal from and return to the main bulk. Any tendency for ingredients not to be evenly distributed due to this action can be avoided by ensuring that concentrates etc. are loaded generally along the length of the trailer rather than in one position, it is found that this does not cause any great difficulty in practice.

As the two agitators are the only moving components in contact with the material and they are driven in the same direction and at one speed throughout the full operating cycle the complexities of gear boxes, reverse or speed change drives, special discharge augers and the like are avoided, the weight and complexity of the mechanism is kept to a minimum, and easy cleaning, maintenance and repair can be carried out. The drive mechanism is readily accessible on the exterior of body 10 after removing safety covers (not shown).

The height of discharge is a particular advantage in modern stock-raising methods.

The above described trailer may have other applications in agriculture or elsewhere, and the invention could be applied to a static mixing device or installation, or to other forms of vehicle, e.g. a self-propelled lorry.

What I claim then is:

1. A vehicle for the high speed mixing, transport and discharge of animal feedstuffs comprising:
   (a) a non-tipping body having a top open for loading by way of an upper zone of the body and a part cylindrical lower zone defined by an unbroken curved floor and wall structure centered on a first longitudinal axis of the vehicle; said lower zone being below said axis;
   (b) a main agitator rotatably driven about said first longitudinal axis in a cylindrical envelope of revolution and provided with longitudinal agitator bars which travel in close proximity to substantially the full axial extent of said curved structure to draw material contained in the body lower zone along said structure in its direction of curvature without any substantial component of movement in an axial direction;
   (c) a laterally projecting extension to one side of the body upper zone and wholly above the level of the first longitudinal axis, which extension is open to the latter zone along the full length of the body, said extension being to that side of the body at which said material is operatively driven upwardly by said main agitator bars;
   (d) a secondary agitator journalled within said extension for rotation about a second longitudinal axis, operatively driven in the same direction of rotation as the main agitator at a substantially higher speed of revolution, and provided with a series of randomly disposed radially projecting elements substantially along the full length of the extension whose radially outer ends intercept the path of movement of material after it leaves the lower zone to separate a proportion of the material from its main bulk and carry it into and around said extension with resultant upward displacement before returning said proportion into an upper region of the body upper zone without any substantial component of movement in an axial direction; and
   (e) a discharge opening along substantially the full length of said extension which can be selectively opened to permit discharge of said material from the extension under the action of said agitators to one side of the direction of travel of the vehicle.

2. A vehicle as in claim 1 wherein the secondary agitator is driven at substantially ten times the speed of revolution of the main agitator.

3. A vehicle as in claim 1 wherein the height of discharge is over 1.38 meters.

4. A vehicle as in claim 1 wherein each agitator bar is individually resiliently mounted on support members of the main agitator so as to be spring loaded radially outwardly of said first longitudinal axis.

5. A vehicle as in claim 4 wherein said spring loading urges said bars to a position at which they travel with a clearance of about 25–30 mm from the inner surface of said curved floor and wall structure.

* * * * *